United States Patent [19]

Cochard et al.

[11] Patent Number: 5,282,043
[45] Date of Patent: Jan. 25, 1994

[54] COLOR VIDEO CAMERA AND METHOD FOR IMPROVING RESOLUTION OF A SEMICONDUCTOR IMAGE SENSOR

[75] Inventors: Roland Cochard, Morges; Marc-Henri Duvoisin, Preverenges; Raymond Pidoux, Vufflens-le-Chateau, all of Switzerland

[73] Assignee: Robert Bosch GmbH, Stuttgart, Fed. Rep. of Germany

[21] Appl. No.: 823,324

[22] Filed: Jan. 21, 1992

[51] Int. Cl.$^5$ .............................................. H04N 5/335
[52] U.S. Cl. ............................. 358/213.28; 358/222; 358/213.26
[58] Field of Search .................... 358/213.28, 213.27, 358/213.11, 222, 41, 42, 47; 354/430; H04N 5/335

[56] References Cited

U.S. PATENT DOCUMENTS

| 4,633,317 | 12/1986 | Uwira et al. | 358/213.28 |
| 4,985,758 | 1/1991 | Hashimoto | 358/44 |
| 5,113,245 | 5/1992 | Oda | 358/41 |

FOREIGN PATENT DOCUMENTS

| 3800406A1 | 7/1989 | Fed. Rep. of Germany | H04N 11/02 |
| 59-15377 | 1/1984 | Japan | H04N 5/26 |
| 60-112377 | 6/1985 | Japan | H04N 5/335 |
| 60-223388 | 11/1985 | Japan | H04N 5/335 |

Primary Examiner—Michael T. Razavi
Assistant Examiner—Tuan V. Ho
Attorney, Agent, or Firm—Frishauf, Holtz, Goodman & Woodward

[57] ABSTRACT

A color television camera has a semiconductor image sensor composed of sensor elements of the CCD type arranged in a raster. The charges produced in the sensor elements within an integration interval are read out as video signals. The image on the semiconductor image sensor is shifted in the horizontal direction by a fraction of a raster unit of measurement from one integration interval to the next integration interval in a cyclical fashion. An increase of the resolution in the vertical direction will then result by reading out the video signals from the semiconductor image sensor. The horizontal image shift is produced in the optical path between the objective lens of the image sensor by means of filter disk mounted so as to be bistable. The filter disk can thereby be flipped through a predetermined angle and back between integration intervals of the image sensor.

10 Claims, 7 Drawing Sheets

| $+\phi_1$ | | $-\phi_1$ | | $-\phi_1$ | | $+\phi_1$ | |
|---|---|---|---|---|---|---|---|
| $+\phi_2$ | | $+\phi_2$ | | $-\phi_2$ | | $-\phi_2$ | |
| $-\phi_3$ | | $+\phi_3$ | | $+\phi_3$ | | $-\phi_3$ | |
| $-\phi_4$ | | $-\phi_4$ | | $+\phi_4$ | | $+\phi_4$ | |
| $+\phi_1$ | | $-\phi_1$ | | $-\phi_1$ | | $+\phi_1$ | |
| $+\phi_2$ | | $+\phi_2$ | | $-\phi_2$ | | $-\phi_2$ | |
| $-\phi_3$ | | $+\phi_3$ | | $+\phi_3$ | | $-\phi_3$ | |
| $+\phi_4$ | | $-\phi_4$ | | $+\phi_4$ | | $+\phi_4$ | |
| $+\phi_1$ | | $-\phi_1$ | | $-\phi_1$ | | $+\phi_1$ | |
| $+\phi_2$ | | $+\phi_2$ | | $-\phi_2$ | | $-\phi_2$ | |
| 131 | | 132 | | 133 | | 134 | |

Fig. 8

| $+\phi_1$ | | $-\phi_1$ | | $-\phi_1$ | | $-\phi_1$ | |
|---|---|---|---|---|---|---|---|
| $-\phi_2$ | | $+\phi_2$ | | $-\phi_2$ | | $-\phi_2$ | |
| $-\phi_3$ | | $-\phi_3$ | | $+\phi_3$ | | $-\phi_3$ | |
| $-\phi_4$ | | $-\phi_4$ | | $-\phi_4$ | | $+\phi_4$ | |
| $+\phi_1$ | | $-\phi_1$ | | $-\phi_1$ | | $-\phi_1$ | |
| $-\phi_2$ | | $+\phi_2$ | | $-\phi_2$ | | $-\phi_2$ | |
| $-\phi_3$ | | $-\phi_3$ | | $+\phi_3$ | | $-\phi_3$ | |
| $-\phi_4$ | | $-\phi_4$ | | $-\phi_4$ | | $+\phi_4$ | |
| $+\phi_1$ | | $-\phi_1$ | | $-\phi_1$ | | $-\phi_1$ | |
| $-\phi_2$ | | $+\phi_2$ | | $-\phi_2$ | | $-\phi_2$ | |
| 131 | | 132 | | 133 | | 134 | |

Fig. 9

COLOR VIDEO CAMERA AND METHOD FOR IMPROVING RESOLUTION OF A SEMICONDUCTOR IMAGE SENSOR

This invention concerns a video camera apparatus having a semiconductor image sensor on which an image of the scene to be reproduced in video signals is focussed. The image sensor has sensor elements arranged in a raster for scanning and the electric charges produced in the sensor elements, after lapse of an integration interval, are read out as video signals.

Semiconductor image sensors for video cameras have become known, especially as so-called CCD sensors, in which a multiplicity of light-sensitive sensor elements are arranged in a raster. By the illumination corresponding to an image of the object to be displayed by video equipment, a charge is integrated in each sensor element during the illumination time and after the end of this integration time is scanned as a video signal. In accordance with their properties, especially the number of sensor elements, which the determines the resolution, the known semiconductor image sensors are designed for video cameras. This involves compromises between partially contradictory requirements. In particular, in the heretofore known semiconductor image sensors, the number of the sensor elements is limited by technological possibilities, manufacturing costs and the size of the sensors.

For various application the spatial resolution obtainable with the known semiconductor image sensors is insufficient. These cases, however, often are applications in which standing pictures or pictures moving only slowly are being converted into video signals, so that movement resolution plays only a subsidiary role.

An electronic CCD camera is already known in which the light-sensitive elements of a semiconductor image sensor are shifted within the image from one integration interval to the next integration interval by a fraction of the spacing (between centers) of the Picture elements (pixels) ("Zeitschrift Elektronik" 16/04.08.1989, pp. 19 and 20). For this purpose a piezoelectric drive of the semiconductor image sensor is used to shift the semiconductor image sensor by a fraction of the spacing between horizontal or vertical pixels. This arrangement requires a d.c. amplifier at high voltage which has a high power dissipation while the semiconductor image sensor is at rest. Furthermore, this arrangement is subject to a temperature drift which leads to undesired static shifting.

SUMMARY OF THE INVENTION

It is an object of the present invention to provide image sensor apparatus for a video camera utilizing a semiconductor image sensor with the least possible technical expense.

Briefly, the image projected on the semiconductor image sensor is shifted at predetermined equal intervals cyclically in the horizontal direction of the image by a fraction of the unit measure of the sensor element raster.

The apparatus of the invention has the advantage that a shift of the image can be produced in a simple manner free of any static shifts. Preferably the shift is produced, back and forth, to the extent of one-half of the unit measure of the raster.

Another particularly useful feature of the invention is the obtaining of the image shift in the horizontal direction of the image within the optical path through which the image is formed on the semiconductor image sensor by using a filter disk, such as is normally used in that path, which is equipped with a mounting that can be basculated over a predetermined small angle. In this elaboration of the invention the semiconductor image sensor is fixed in place in the camera so that connections through flexible litz wiring are not necessary. This results on one hand in a saving in cost and on the other an improvement in reliability, since flexible conductors are likely to be extremely fragile because of the large number of mechanical cycles that are necessary for moving the sensor relative to an image of fixed position. In accordance with the feature of the invention just mentioned the aforesaid intervals between image shifts in the horizontal direction are intervals containing an equal number of complete revolutions of the filter disk which number of revolutions is equal in duration to the time needed for scanning a complete color television picture except for the shift, plus an additional revolution during which the shift could impair a read-out. A complete television picture, of course is produced only in every cycle of image shift.

A further development of the invention consists in that raising the resolution in the vertical direction is obtained with the use of a suitable control of the semiconductor image sensor. In that way a further simplification of the opticalmechanical image shift is possible. In the case of a frame-transfer semiconductor image sensor with four phases per sensor element line that trasmission of the charge out of the image region into a buffer memory region is preferably performed in such a way that successive partial images are offset by one phase from the preceding partial image.

In addition, the high voltage necessary for piezoelectric movement and the disturbing electric fields resulting thereform are fully avoided in the case of the present invention by use of an entirely different type of drive for the bistable positioning of the filter which produces the image shift.

The connections between the semiconductor image and the electronic circuit related thereto both have a fixed plate so that connections made by flexible wires produce electromagnetic fields for which the apparatus is sensitive. It is thereby made possible to reduce the noise level of the video signal that is generated.

An advantageous embodiment of the improved invention makes possible a highly accurate shifting of the image. A drive system and a position sensor are provided for controlling the flip movement of the filter disk. An output signal of the position sensor is supplied, along with an electrical signal corresponding to the desired position, are supplied to a control circuit that is essentially a servo system and the output of that control circuit is supplied by an electromechanical drive.

The mechanical force of the electromechanical drive can conveniently be provided by a coil axially movable within a magnetic field of a permanent magnet.

DRAWINGS

The invention is further described by way of illustrative example with reference to the annexed drawings, in which.

Figure 6:
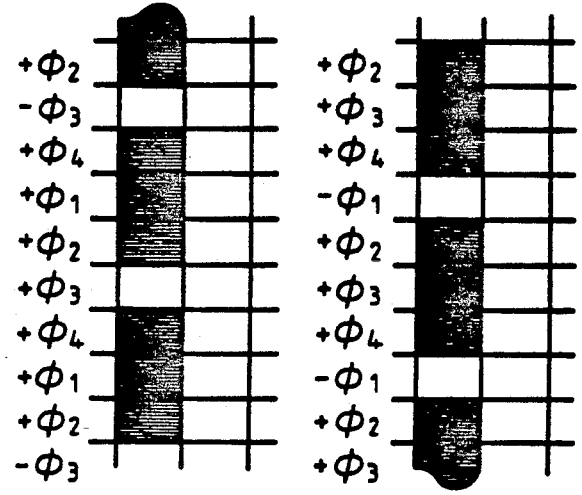
FIG. 6 is a representation of the generation of video signals of two picture fields by previously known CCD cameras.
Figure 7:
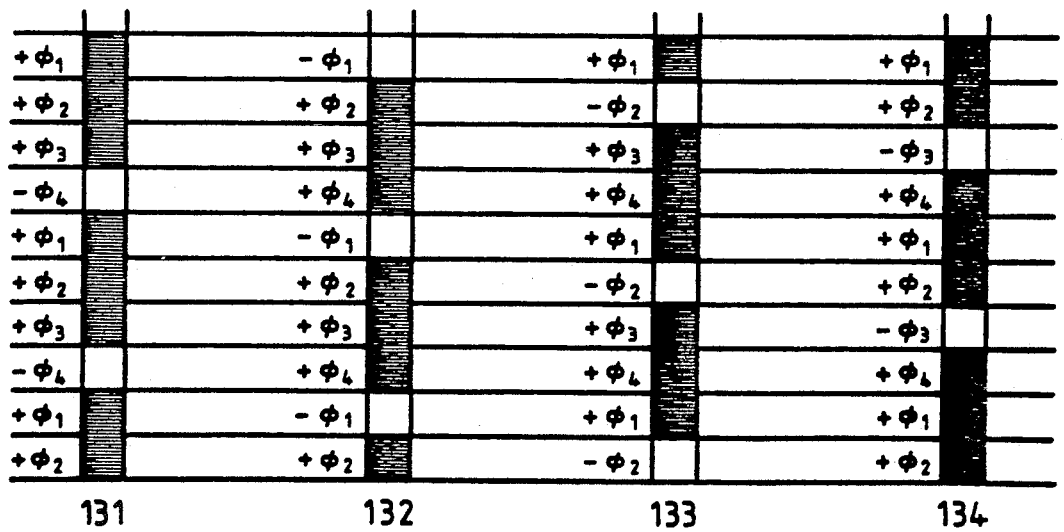
FIG. 7 is a representation of the generation of four picture fields in a camera apparatus according to the invention.
Figure 10:
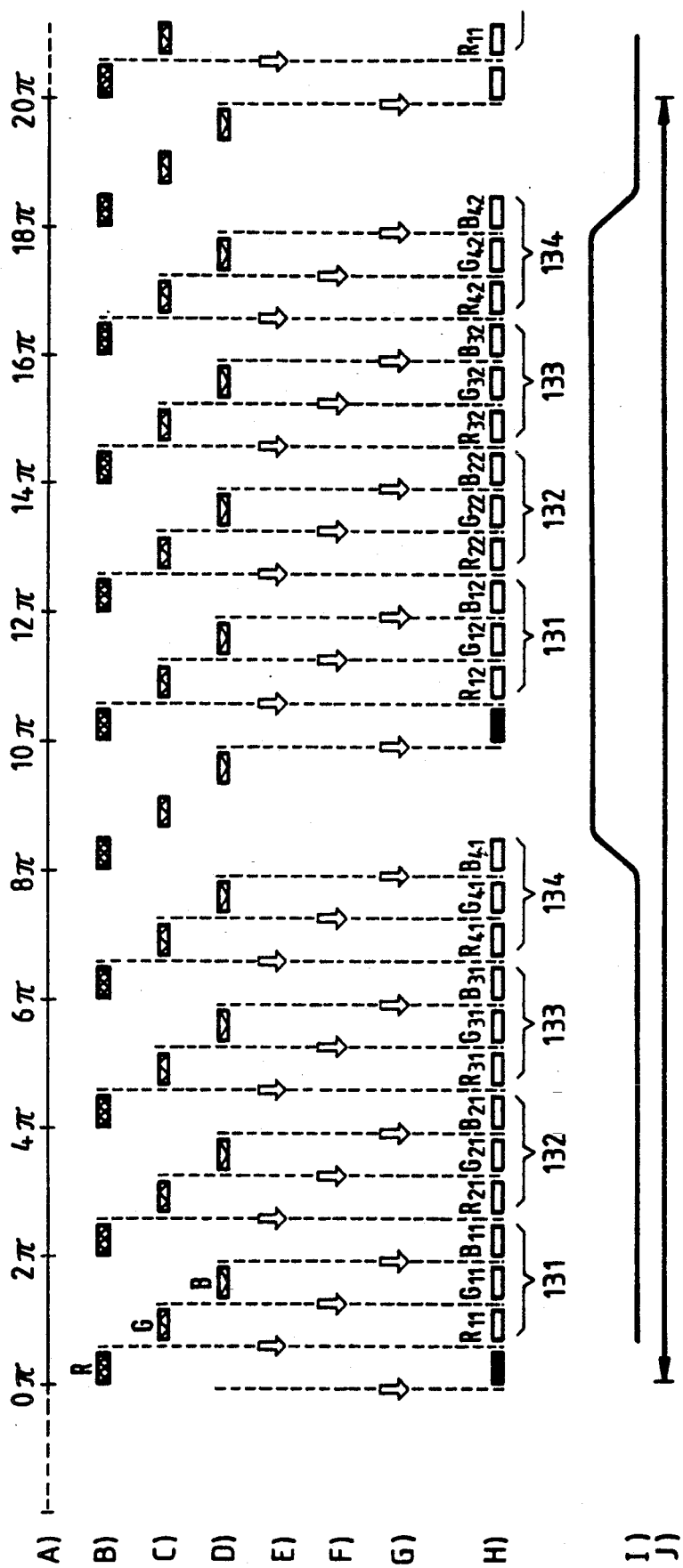

FIGS. 8 and 9 respectively represent alternatives for FIGS. 6 and 7;

and FIG. 10 is still another diagram of video signal generation in successive picture fields.

DESCRIPTION OF THE ILLUSTRATED EMBODIMENTS

Figure 1:
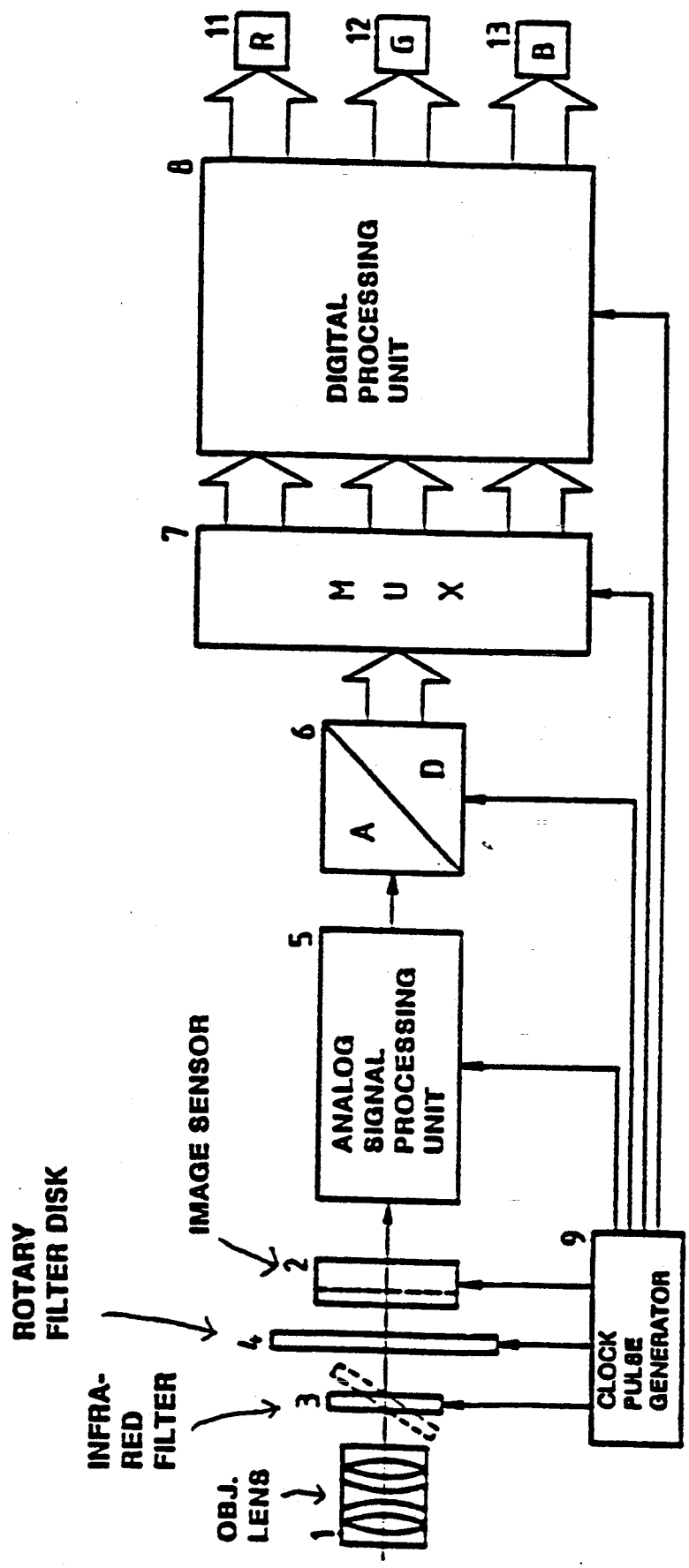
FIG. 1 is a schematic representation of a video camera apparatus according to the invention.

In the video camera apparatus schematically shown in FIG. 1 light from an illuminated object, of which a picture is to be reproduced, is gathered by an objective lens which focuses an image of the object on the light-sensitive surface of a semiconductor image sensor 2. The semiconductor image sensor is provided with a multiplicity of light-sensitive sensor elements forming a raster suitable for scanning. In the optical path between the objective 1 and the semiconductor image sensor 2 are an infrared filter 3 and a filter disk 4. The latter serves for sequential selection of the color components R, G, B of light passing through the optical path just mentioned for focusing of the image information on the semiconductor image sensor 2. In this way a monochrome semiconductor picture sensor can be used for a color camera. Details of such a color camera are shown in German patent applications P 38 00 406 and P 40 08 169 assigned to the assignee of this application.

The infrared filter 3 is also present in previously known video cameras having semiconductor image sensors, because such image sensors are highly sensitive to infrared rays. In the apparatus of the invention, however, the infrared filter 3 can be flipped through a small angle by means of a drive described further below, as indicated with great exaggeration in FIG. 1. In consequence there is produced a shifting of the image on the light sensitive surface of the semiconductor image sensor 2.

The output signals of the semiconductor image sensor 2 are first subjected to analog signal processing in the unit 5. There usually follows after that a preliminary Processing of the signal. Thereafter analog-to-digital conversion takes place in the converter 6, the output signals of which are supplied to a multiplexer 7. The function of the multiplexer 7 and the function of the storing and digital processing in the unit 8 will be understood in connection with the following explanations.

A clock pulse generator 9 provides clock pulse signals to the individual component groups of the apparatus of FIG. 1. Digital color value signals R, G and B are made respectively available at the outputs 11, 12 and 13. In an illustrative example that was built, a filter disk was provided having segments of 85° respectively for the colors red, green and blue. The rate of revolution of the filter disk was 16-⅔ per second. As will be explained in still more detail in connection with FIG. 10, ten revolutions are needed for scanning a complete color television picture, so that the picture frequency of 1 and ⅔ Hz results.

Figure 2:
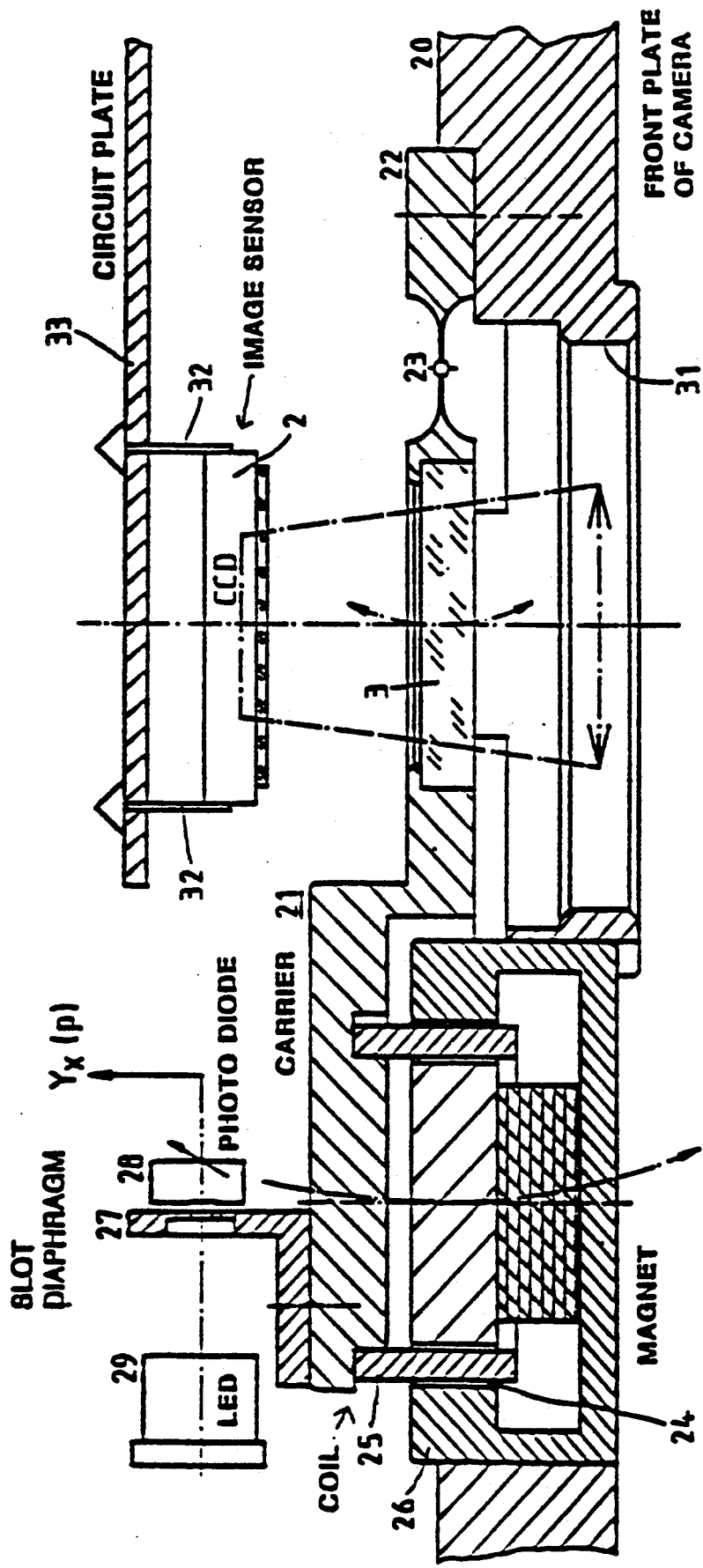
FIG. 2 is a sectional view of parts of the apparatus of FIG. 1 showing the shifting of a picture with a flippable filter disk.

FIG. 2 shows an example of a preferred embodiment for the shifting of the image by means of the flippable filter disk 3 which is mounted on a carrier 21 preferably made of light metal. The carrier 21 is pivoted on a front plate 20 so that it can swing. For this reason the carrier 21 has a small wall thickness at 23 and a part 22 of the carrier 21 is firmly connected to the front Plate 20 of the video camera. In this manner of mounting friction is kept extremely small. At the end of the carrier 21 remote from the flexible mount there is a coil 25 which projects into a pot-shaped magnet 26. The coil 25 and thereby the carrier 21 are more or less deflected downwards or upwards in accordance with the strength and direction of the current flowing through the coil 25.

The front plate 20 is provided with a socket 31 for an objective lens. The filter disk 4 of FIG. 1 is not shown in FIG. 2 to simplify the illustration. The semiconductor image sensor 2 is installed on a circuit plate 33 in a known way by means of connection Pins inserted in bores in the circuit plate and is connected electrically by soldering to the conductive paths on the circuit plate 33.

A slot diaphragm 27 is located on the movable carrier 21. This slot diaphragm, in combination with the fixed light emitting diode 29 and the fixed light-sensitive differential photo-diode 28, form a position sensor. This position sensor has the function of converting the angular position $Y_x(p)$ of the movable carrier 21 and therefore of the filter 3 into an electrical signal $U(Y_x(p))$.

Figure 4:
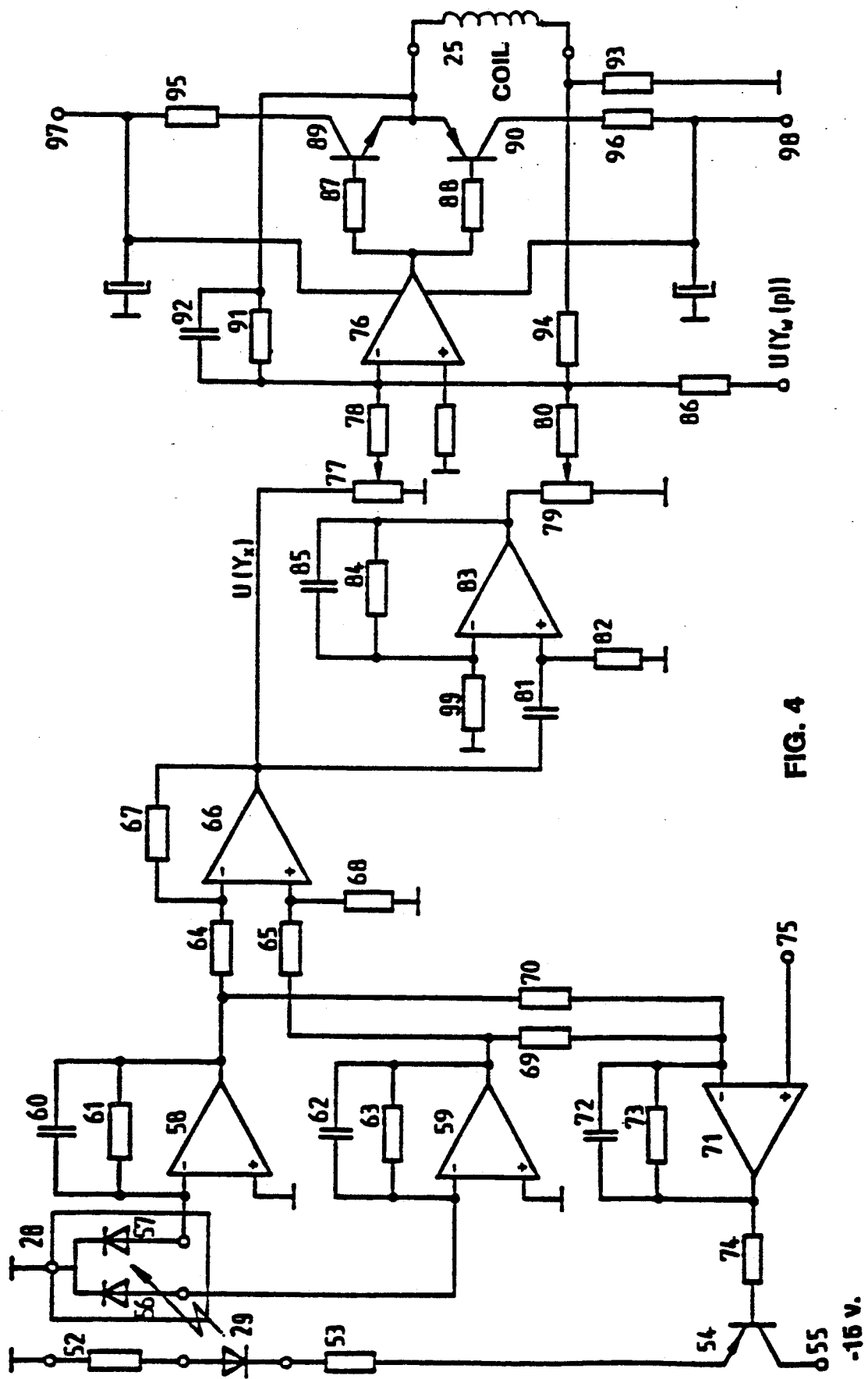
FIG. 4 is a detailed circuit diagram of a regulating circuit.

The light energy of the light emitting diode 29 transmitted through the slot diaphragm 27 is thereby so modulated by the movement of the slot diaphragm 27 that the received illumination strength may differ from one to the other of the two photo diodes 56 and 57 shown in FIG. 4, which constitute the differential photo diode 28 (FIG. 2).

The difference formation of the information from the two photo diodes 56, 57 of the differential photo-diode 28 therefore designates the sign and the amplitude of the relative movement of the movable carrier 21 with respect to the fixed part 20.

By way of the geometric characteristics of the system just described the above-mentioned amplitude is, in a sufficient measure, proportional to the shifting of the image in the image plane.

Figure 3:
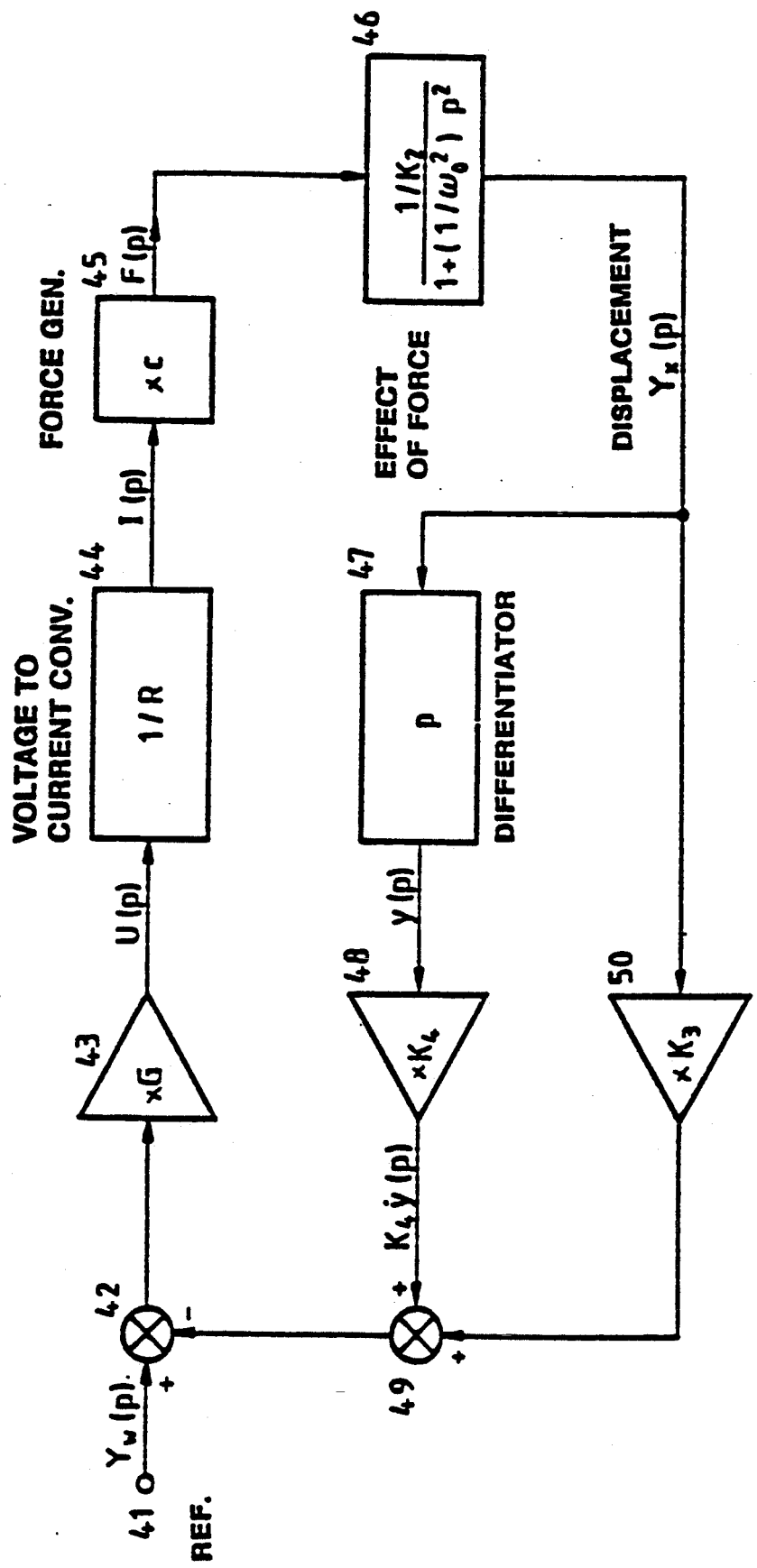
FIG. 3 is a block diagram of a positioning control for the filter disk.

FIG. 3 is a circuit block diagram of the position regulation of the filter disk. A reference voltage value $y_w(p)$ is supplied at 41 to a subtractor 42. The output of the subtractor 42 is amplified by the factor G and produces the voltage U(p), which is applied to the coil 25 (FIG. 2). In the block 44 division by the total resistance R produces the value of the current I(p). This current value is converted into the force F(p) at 45 by multiplication with the constant c of the hollow magnet 26 (FIG. 2). This force F(p) bears on the carrier 21 (FIG. 2). It produces a displacement $y_x(p)$ which depends not only on the force F(p) but also on the mass and the resonant frequency of the elastically suspended carrier, as is indicated in formula in the block 46. An electrical signal $y_x(p)$ corresponding to the displacement (=actual value of the position) is generated by the position sensor 27, 28, 29 (FIG. 2) and is supplied to the previously mentioned subtractor 42. For obtaining a PD controller characteristic, the value $y_x(p)$ is on the one hand weighted by a constant $k_3$ and on the other hand, after differentiation at 47 and multiplication by a constant $k_4$ at 48 is supplied to an addition unit 49 along with $Y_x(p) \cdot k_3$.

Small angular deviations of the filter disk suffice for shifting of the image. Thus for example an experimental construction was built with the angular deviation at a value of 0.4° and produced an image shift in the plane of the image sensor which corresponds to half the spacing between centers of the picture elements (pixels)., about 5 ∞m. For avoiding alias effects a high precision of the shift is necessary. In the embodiment that was built it was possible, by the position regulation described above, to obtain deviations of half a raster unit measure while maintaining an accuracy of less than ±2%. This corresponds to a value of ±0.1 μm for a 5 μm half-raster-unit measurement.

FIG. 4 shows a circuit for the position regulation of the filter. The light emitting diode 29 is supplied with current through a series connection of two resistances 52., 53 and a transistor 54. The resistance 52 is connected to reference potential (ground) and the transistor 54 with one pole 55 of an operating voltage source which provides −15 volts with respect to reference voltage (ground). As will be explained further below, the transistor 54 allows a regulation of the current and thereby regulation of the strength of illumination impinging on the two photo diodes 56 and 57 of the differential photo-diode 28.

The signal of the photo-diode 57 is supplied to the inverting input of a first operational amplifier 58 and functions as a current-to-voltage converter. The feedback resistance 61 determines the conversion factor between the photo-generated current and the voltage. A capacitor 60 is provided also in the feedback connection, so that the amplifier has a low-pass characteristic. In a similar way, another operational amplifier 59 having a feedback path 62, 63 is provided for the photo-diode 56.

The output voltages of the operational amplifiers 58 and 59 are respectively supplied through resistances 64 and 65 to the inverting and non-inverting inputs of still another operational amplifier 66. The latter likewise has a feedback resistance 67 and another resistance 68 for fixing the amplification. Since the operational amplifier 66 amplifies the amplified output voltages of the photo-diodes 56 and 57., there is present at the output of this last operational amplifier a signal $U(y_x)$ which is representative of the actual position of the carrier 21 and thereby also of the filter 3 (FIG. 2).

The output voltages of the operational amplifiers 58 and 59 are respectively supplied through resistances 69 and 70 to the inverting input of an operational amplifier 71 for control of the brightness of the light emitting diode 29. Constant voltage applied at 75 is applied to the non-inverting input of the operational amplifier 71. In the feedback connection of the operational amplifier 71 are located a capacitor 72 and a resistance 73. The output is connected through a resistance 74 with the base of the transistor 54. The low pass behavior for which the capacitor 72 is provided prevents brightness changes of the light emitting diode during the movement of the slot diaphragm 27 (FIG. 2).

The subtraction at 42 and the addition at 49 (FIG. 3) take place at the inverting input of the operational amplifier 76. For that purpose the voltage $U(Y_x)$ is supplied on the one hand through a potentiometer 77 for setting the factor $k_3$ and through a resistance 78 to the inverting input. On the other hand, the voltage $U(Y_x)$ is differentiated and is supplied to a potentiometer 79 for setting of the factor $k_4$ and through a resistance 80. The differentiating unit 81, 82 serves for differentiating the output of the operational amplifier 66 and supplying the resulting voltage to a non-inverting input of another operational amplifier 83 which has a feedback circuit branch 84, 85, the static voltage amplification factor being determined by the resistances 84 and 89. The inverting input of the operational amplifier 76 is also supplied, through a resistance 86, with a reference voltage $U(Y_x(p))$ which represents the desired position of the carrier 21. A push-pull final stage consisting of two complementary transistors 89 and 90 is connected through resistances 87 and 88 to the output of the operational amplifier 76. The output of that final stage is connected on the one hand to a terminal of the coil 25 and on the other hand to a Parallel combination of a resistance 91 and a capacitor 92, the other end of which is connected to the inverting input of the operational amplifier 76.

The other terminal of the coil 25 is grounded through a resistor 93. The voltage drop across the resistance 93 is proportional to the current through the coil 25. This voltage is supplied through a resistance 94 to the inverting input of the operational amplifier 76. As a result of this feedback connection the amplifier which is constituted by the operational amplifier 76 together with the push-pull stage 89, 90 has the characteristic of a controlled current source which impresses current on the coil 25. The collectors of the transistors 89 and 90 are respectively connected through current limiting resistors 95 and 96 with terminals 97 and 98 from which positive and negative operating voltages are respectively supplied.

Figure 5:
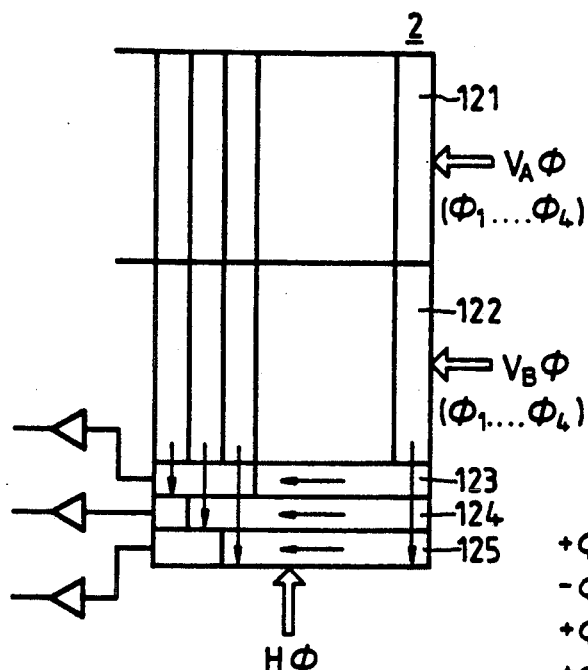
FIG. 5 is a schematic representation of a semiconductor picture sensor.

FIG. 5 shows a semiconductor image sensor 2 in so-called frame-transfer technology. These semiconductor image sensors have an image region 121 and a storage region 122, the latter serving for intermediate storage of the signals arising in the image region. The image region 121 is illuminated by the image to which the sensor is exposed. The image region 121 consists of sensor elements arranged in columns and lines. In a known semiconductor image sensor 288 lines and 600 columns are provided, a line being in each case determined by four phases, of which one always serves as an interlaced line. This leads to a so-called pseudo-interlaced line, because with alternation of picture fields the phases that are used are $\phi 4$, $\phi 1$, $\phi 2$, $\phi 3$, $\phi 4$, respectively, as is shown schematically in FIG. 6. The interlaced picture fields are designated 126 and 127 in FIG. 6.

Among other things it should be mentioned that in the image region 121 clock signals VAΦ are applied to produce a transmission of the charge image into the storage region 122. The stored content is read out of the storage region 122 by means of further clock signals VBΦ and is written into the output registers 123, 124 and 125 in such a way that in each readout the pixels belonging to one television line can be read out by pulses of a rhythm Hφ from the group of output registers 123, 124 and 125. For this purpose the first pixel of a line is always written into the output register 123, the second pixel into the output register 124, the third pixel into the output register 125, and so on in a repeating cyclic sequence.

In the illustrated embodiment of the apparatus of the invention, four picture fields are produced as follows:

In a first picture field 131 charges under the electrodes which are respectively controlled by means of the phases $\phi 1$, $\phi 2$ and $\phi 3$ are combined. In a second picture field 132 the charges under the electrodes of the phases $\phi2$, $\phi3$ and $\phi4$ are combined in the same way. The signal of a third picture field 133 is provided by the combination of the charges of the phase electrodes $\phi3$, $\phi4$ and $\phi1$. Finally, a fourth picture field 134 provided from combined charges of the phase electrodes $\phi4$, $\phi1$ and $\phi2$. Compared to the conventional reading-out illustrated in FIG. 6., alias components of the vertical image direction are strongly reduced. The read-out scheme as described in FIG. 7 produces, instead of two picture fields, four fields each of which is offset by one sensor line with respect to another.

In the case of a CCD semiconductor sensor with four phase electrodes it is possible to combine the charges in accordance with the variants of FIGS. 8 or 9 for the corresponding phase electrodes.

As can be easily recognized in FIG. 8 or FIG. 9, the charges under the active electrodes are more or less densely combined according to the number of inactive electrodes which serve for channel blocking. This arrangement in fact leads to reduction of the equivalent optical aperture of the camera and thereby has the effect of an increase of the spatial resolution in the vertical direction.

FIG. 10 shows the time course of the illumination signal generation events in the color video camera illustrated in FIG. 1. In row A there is plotted the angle of rotation of the filter disk 4—in this case for 10 revolutions and from 0 $\pi$ to 20 $\pi$. The rows B., C and D respectively show integration intervals provided by the corresponding segments of the filter disk for the colors R, G and B. The downward-pointing arrows in the rows E, F and G designate the transfer-pulse of the charges for R, G and B by which the charges shifted out of the image region 121 into the storage region 122 (FIG. 5).

Row H shows the time sequential read-out intervals for the signals R, G and B. Finally, in the line I a flip signal of the IR filter is shown, while the line J represents the period in which the color television camera according to FIG. 1 periodically produces a complete picture.

During the first four revolutions of this period (from 0 $\pi$ to 8 $\pi$) the semiconductor image sensor is illuminated four times in succession by the red, green and blue color components. In consequence, there are produced corresponding sequential signals $R_{11}$, $G_{11}$ and $B_{11}$ to $R_{41}$, $G_{41}$ and $B_{41}$. The clock signals VB$\Phi$1 to VB$\Phi$4 are in the meanwhile shifted three times by one sensor line so that there results in accordance with FIG. 6, a combination of the sensor lines into picture fields 131 to 134.

Since the change of the flip angle of the filter during the revolution $8\pi$ to $10\pi$ does not take place in practice during an infinitely short time, some resulting signals are nevertheless not evaluated, because that would lead to noticeable lack of sharpness.

In the four following revolutions from $10\pi$ to $18\pi$ integration takes place and signal generation proceeds as in the case of the first four revolutions. In the last four revolutions, however, the image is shifted in the horizontal direction by half a raster measurement unit as a result of the flipping of the infrared filter. The signals thereby produced are designated in FIG. 10 as $R_{12}$, $G_{12}$ and $B_{12}$ to $R_{42}$, $G_{42}$ and $B_{42}$. During the immediately following revolution from $18\pi$ to $20\pi$ there again is produced an unusable image. At $20\pi$, therefore, after 10 revolutions, the described cycle repeats.

Although the invention has been described by reference to a particular illustrative example, it will be understood that variations and modifications are possible within the inventive concept.

We claim:

1. Video camera apparatus, comprising
   an optical system including an objective lens and an optical path for forming an image of a scene or object at a focal plan within an enclosure;
   a rotary filter disk (4) in said optical path of said optical system connected to rotary driving means for sequentially supply to said scene or object image, in cyclical fashion by means of separate sector color filters, color range selections of said image formed at said focal plane;
   a semiconductor image sensor having no substantial chromatic discrimination, having a multiplicity of semiconductor sensor elements disposed in lines and columns forming a raster and being exposed to said image in said focal plane, said sensor elements being of a kind in which electric charge accumulates during exposure to said image, said image sensor also including means for reading out said accumulated electric charges of sensor elements after exposure thereof to said image through a single said sector color filter of said filter disk,
   said semiconductor image sensor being a frame transfer image sensor operable with four phase electrodes per sensor element line, which each produce gathering of charges generated for a picture field within successive complete revolutions of said rotary filter disk under said respective phase electrodes in repeated sequences between each of which there is interposed a single revolution of said rotary filter with respect to which no charges are usefully gathered, said repeated sequences being so arranged that, from one picture field to the next, the location of a said sensor element line is displaced by a single phase-electrode step, and
   said optical system including bistable means for suddenly shifting said image for a distance of a fraction of a raster unit in the direction of said raster which corresponds to said sensor element lines, said sudden shifts being alternately forward and back, and occurring during said respective revolutions of said filter disk which are interposed between said successive sequences of complete revolutions of said filter disk.

2. The camera apparatus of claim 1, wherein said fraction of a raster unit is half a raster unit.

3. The camera apparatus of claim 1, wherein said means for reading out said accumulated electric charges of sensor elements include means for providing sequential reading out of video signals so as to minimize alias components in the direction corresponding to said columns of said semiconductor sensor elements.

4. The camera of claim 3, wherein means are provided for raising image resolution in the direction of said image corresponding to said columns of said semiconductor sensor elements by limiting the gathering of charges at all times to less than three of the four phase electrodes of said semiconductor image sensor and to phase electrodes which are active in the displacement of the location of a said sensor element line.

5. The camera apparatus of claim 1, wherein said bistable image-shifting means is an optical filter (3) having a mounting (21) provided with means for controllably flipping said mounting back and forth through a small angle.

6. The camera apparatus of claim 5, wherein said means for controllably flipping said optical filter mounting includes a filter mount position sensor (27, 28, 29) having an output, a source of desired position value having an output, said last-mentioned two outputs being connected to regulator means for comparing the output of said position sensor with the output of said desired position value and thereby producing an error signal, and means for shifting said mounting (21) of said optical filter (3) in response to said error signal.

7. The camera apparatus of claim 6, wherein said means for controllably flipping said optical filter mounting comprises a coiled conductor movably mounted in a magnetic field.

8. The camera apparatus of claim 6, wherein said mounting of said optical filter (3) and said means for controllably flipping said optical filter mounting comprise a filter-disk carrier (21) which is connected at a first side to a fixed structural camera member (20) by means of an elastic strip (23) and at a second side, opposite said first side, to said means (23, 25, 26) for controllably flipping said optical filter mounting and to said filter mount position sensor (27, 28, 29).

9. A method of improving the resolution of a picture represented by and derivable from a color television signal produced by a color television camera having an objective lens for producing an image at a focal plane of said lens and a semiconductor image sensor having a multiplicity of semiconductor sensor elements disposed in columns and lines in a raster exposed to said image in said focal plane, said sensor elements being of a kind in which electric charge accumulates under four phase electrodes during exposure to said image no substantial chromatic discrimination, having gathering charges generated cyclically under respective corresponding phase electrodes of an image region (121) of said image sensor and transferring to said memory portion of said image sensor the charges gathered under respective corresponding phase electrodes of an image region (121) of said image sensor in such a way that in reading out said charges from memory the location of an active sensor element line is displaced, in said column direction, from one picture field to the next by a single phase electrode step, said pictures fields respectively corresponding to charges gathered under different phase electrodes;

transferring said charges as gathered for each picture field to a memory portion (122) of said image sensor, suddenly shifting said image a fraction of a raster unit in a direction corresponding to said lines of said sensor elements by mechanically controlled optical means, alternately in one sense and the other, after each complete cycle of gathering of charges under different phase electrodes;

reading out sequential video signals from said memory portion of said image sensor, whereby the resolution of said video signals is improved both in a direction corresponding to lines and in a direction corresponding to columns of said sensor elements, wherein exposing of said sensor elements of said image sensor is made color-sensitive by a rotary filter disk having sector color filters providing red, green and blue images in repeated succession, each cycle of said red, green and blue images corresponding to a gathering of charges for a single picture field produced in a cycle of gathering charges under respective corresponding phase electrodes, and an additional cycle of said red, green and blue images being provided between each complete cycle of gathering charges under respective corresponding phase electrodes, during which additional image color cycles said sudden shifts of said image occur in a direction corresponding to said lines of said sensor elements, and no useful gathering of charges take place in said additional color cycles.

10. The method of claim 9, wherein the gathering of charges under a plurality of phase electrodes is carried out at all times by gathering and transferring to memory charges from under less than three out of four phase electrodes of a semiconductor sensor element and limiting the gathering and transferring to charges gathered under phase electrodes which are active for shifting of said picture fields in said column direction of said semiconductor image sensor.

* * * * *